May 19, 1931.                J. A. MELLON                1,806,482
                              DAVIT WINCH
                       Filed Sept. 5, 1928    2 Sheets-Sheet 1
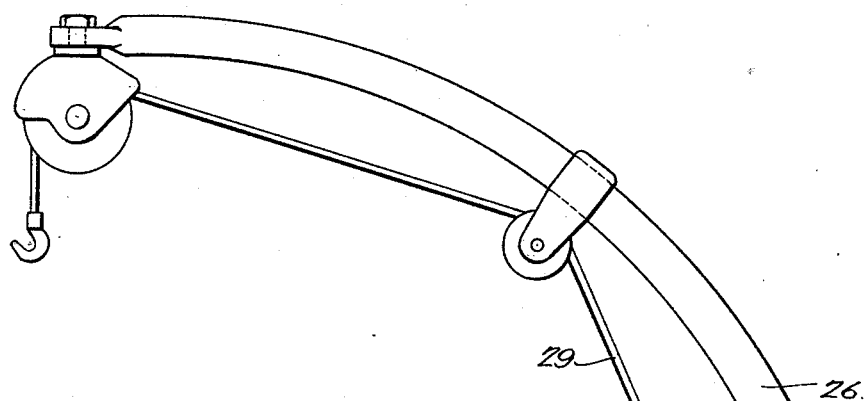
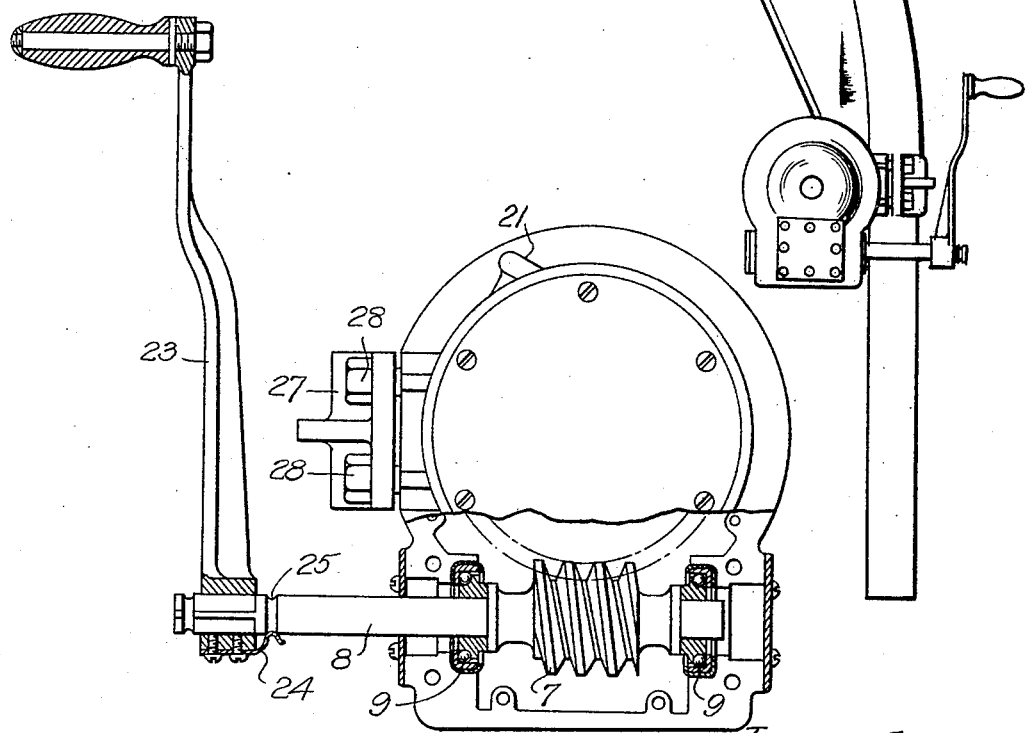
Inventor:
James A. Mellon
by his Attorneys
Howson + Howson

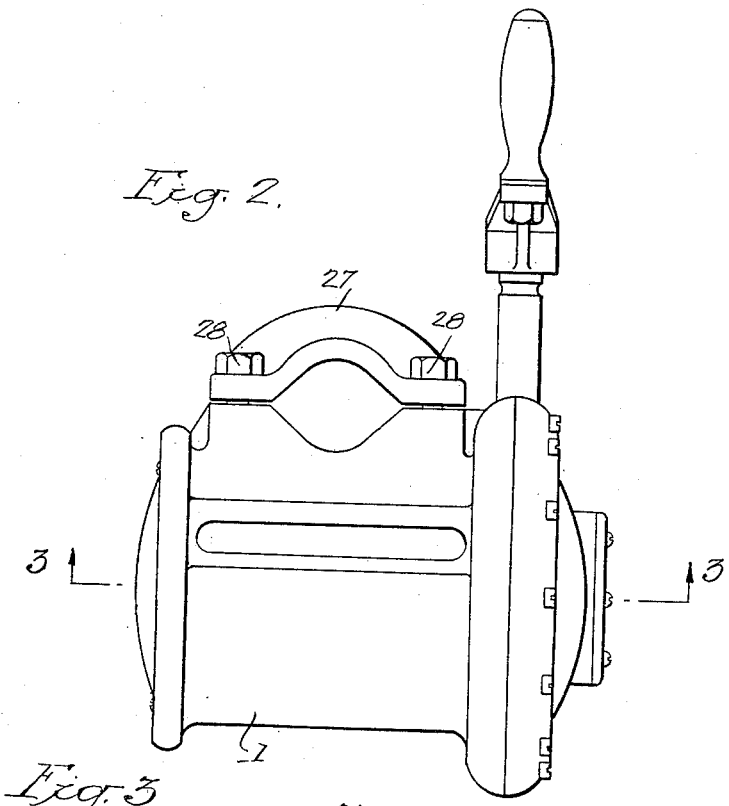
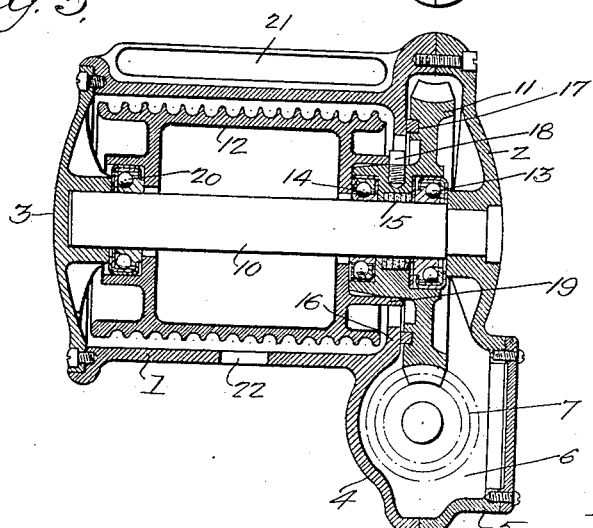

Patented May 19, 1931

1,806,482

UNITED STATES PATENT OFFICE

JAMES AUGUSTINE MELLON, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

DAVIT WINCH

Application filed September 5, 1928. Serial No. 304,015.

This invention relates to improvements in hand-operated davit winches, and the principal object of the invention is to provide a simple yet highly efficient device of this character which shall be characterized by compactness of form and generally neat appearance.

A further object of the invention is to provide a device of this character in which the operating parts including the rotary drum are completely encased in a suitable housing.

The invention further resides in certain novel structural features and details hereinafter set forth and illustrated in the attached drawings, in which:

Figure 1 is an end elevation of a winch made in accordance with my invention, a part of the housing being cut away to disclose details of the operating mechanism;

Fig. 2 is a plan view of the winch;

Fig. 3 is a section on the line 3—3, Fig 2, and

Fig. 4 is a side elevational view showing a portion of the davit with the winch attached thereto.

With reference to the drawings, the winch in a preferred form comprises a housing consisting of a main housing member 1, which is substantially cylindrical in form, and housing heads or end members 2 and 3 secured respectively to the opposite ends of the member 1 and with the said member forming a substantially closed housing. The housing member 1 and the end member 2 have corresponding depending parts, 4 and 5 respectively, which form at one end of the housing a transverse chamber 6 in which is mounted a worm 7, the worm being carried by a shaft 8 which projects through one end of the transverse extension and is supported in ball bearings 9, 9 mounted in the housing, as illustrated in Fig. 1.

The end member 2 has secured therein a shaft 10 which in assembly, projects through the housing 1, as shown in Fig. 3, and finds a bearing at the opposite end of the housing in the end plate 3. In the present instance, the shaft 10 is riveted into the end member 2. This shaft 10 constitutes a support for a worm wheel 11 which meshes with the worm 7 and also for a rotary grooved drum 12 which occupies a position in the main housing 1. Ball bearings 13 and 14 are provided for the gear 11, and it will be noted by reference to Fig. 3 that between these bearings the hub of the gear 11 is recessed for reception of suitable packing 15 effectively sealing the joint between the gear and the shaft 10.

Adjacent that end to which the head or end member 2 is attached, the main housing member 1 is provided with an inturned flange 16 between which and the gear 11 is provided a packing ring 17, said ring being established in an annular groove in the inner face of said gear and normally bearing against the outer face of the said flange. The packing 15 and the packing ring 17 effectively separate that portion of the interior of the housing immediately enclosed by the end member 2 and that part occupied by the drum 12, which permits the thorough lubrication of the worm and worm gear and prevents passage of the lubricant into the drum chamber.

The drum 12 is supported at its inner end upon the hub of the gear 11 and is fixed to the gear circumferentially by a set screw 18 which projects beyond the hub of the gear and into a recess in the drum flange 19 which immediately surrounds or embraces the said hub, as illustrated in Fig. 3. The other end of the drum is supported upon a ball bearing 20 which is supported by the shaft 10 and which fits neatly within an annular flange projecting horizontally from the interior web of the drum. The housing member 1 is provided at the top with a longitudinal port 21, corresponding in length substantially with the length of the drum, through which opening a cable may pass to the drum in the interior of the housing. The housing member 1 is also provided at the bottom with a port 22 providing an outlet for water or other substance entering the drum chamber.

The projecting end of the shaft 8 is adapted for reception of a handle crank 23. This crank has an opening corresponding to the angular shape of the extremity of the shaft 8, and carries a spring 24 the end of which fits into an annular groove 25 in the shaft 8 to normally retain the crank in position on the end of the shaft. The device permits the ready removal of the crank from the shaft if this is desired. It will be apparent that by means of the crank and through the intervening transmission mechanism including the shaft 8, the worm 7 and the worm wheel 11, the drum 12 may be rotated in either direction.

The winch as described above is adapted to be secured to a davit or the like 26, as illustrated in Fig. 4, and to this end the housing is provided upon the main part 1 with a clamp 27 which is adjustably secured to the housing by means of bolts 28, 28. The inner faces of the clamp 27 and of the opposed portion of the housing are appropriately shaped to embrace the davit. It will be noted that the clamp 27 is placed on that side of the housing from which the shaft 8 and the operating lever 23 project, so that when mounted, the housing and the operating lever 23 are positioned on opposite sides of the davit. This arrangement economizes space by distributing the parts of the winch to best advantage with respect to the davit.

In practice, the cable 29 is passed to the drum 12 through the housing port 21 and is wound upon the drum in the usual manner, the cable being distributed over the surface of the drum by the spiral grooves in the latter.

In assembling the winch, the worm shaft 8 may be placed with its bearings in the end member 2, and the worm wheel 11 with its bearing and the packing 15 inserted over the fixed shaft 10. Thereafter, the main housing member 1 and the end members 2 are secured together, the drum with the bearing 20 being thereafter inserted over the shaft 10 and in position on the hub of the gear 11 with the pin 18 occupying the recess in the drum flange provided for that purpose. The assembly is then completed by application of the end plate 3 to the housing.

The device is compact in form, simple and highly efficient in operation and constitutes a material advance in design of devices of this general character.

I claim:

1. In a winch, the combination with a housing, of a relatively fixed shaft extending longitudinally through said housing, a drum journaled on said shaft, a worm wheel also journaled on the shaft and operatively connected with the drum, a flange in the interior of the housing intermediate the drum and said wheel, a stuffing box affording a seal between the worm wheel and the shaft, a packing member sealing the space between the worm wheel and said flange, a rotary shaft journaled in the housing and projecting therethrough, and a worm on said shaft meshing with said worm wheel.

2. In a davit winch, the combination with a housing, of a fixed shaft extending through the interior of said housing, a drum journaled on said shaft, a port in said housing affording access to said drum from the exterior, a worm wheel journaled on said fixed shaft at one end of the drum, means for connecting the said wheel and drum, a rotary shaft journaled in the housing and projecting therethrough, a worm on said rotary shaft cooperative with said worm wheel, means for sealing the joint between the worm wheel and the fixed shaft upon which said wheel is journaled, and an annular packing element carried by said worm wheel and adapted to engage a wall of said housing to form a sealed joint between that portion of the casing occupied by the worm and worm wheel and the drum chamber.

JAMES AUGUSTINE MELLON.